Figure 5:
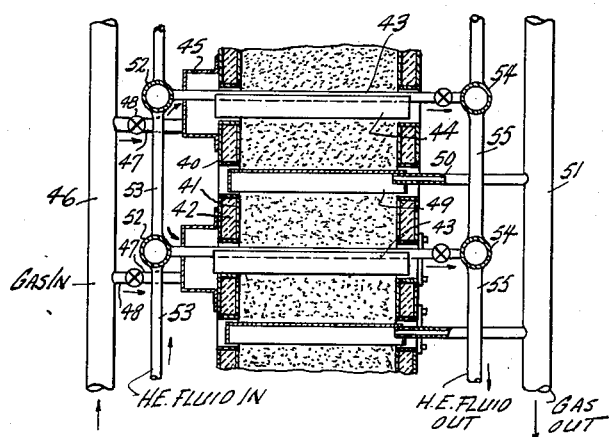

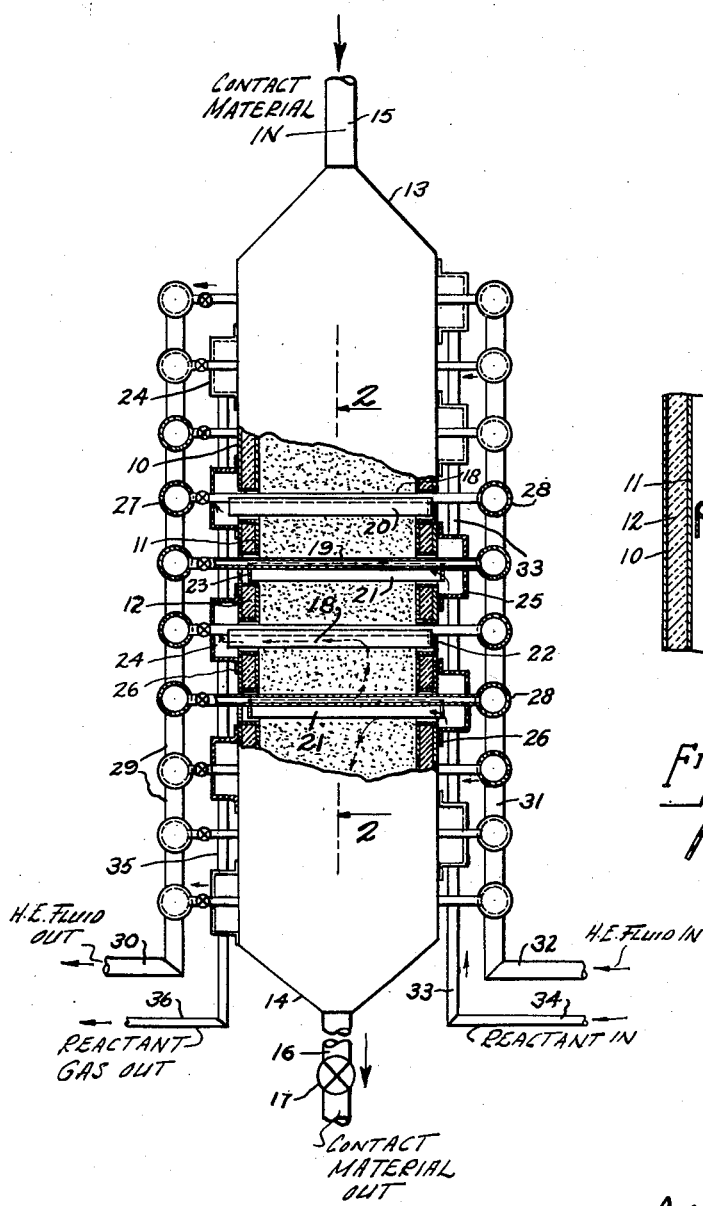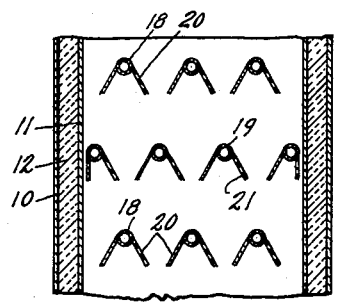

Nov. 6, 1951   J. A. CROWLEY, JR   2,574,247
METHOD FOR CONDUCTING REACTIONS IN
THE PRESENCE OF A SOLID MATERIAL
Original Filed Oct. 14, 1944   3 Sheets-Sheet 3

INVENTOR.
John A. Crowley Jr.

Patented Nov. 6, 1951

2,574,247

UNITED STATES PATENT OFFICE 2,574,247

METHOD FOR CONDUCTING REACTIONS IN THE PRESENCE OF A SOLID MATERIAL

John A. Crowley, Jr., Scarsdale, N. Y., assignor to Socony-Vacuum Oil Company, Incorporated, a corporation of New York Continuation of application Serial No. 558,695, October 14, 1944. This application July 8, 1948, Serial No. 37,634

7 Claims. (Cl. 196—52)

1

This case is a continuation of application Serial Number 558,695, filed in the United States Patent Office October 14, 1944, now Patent No. 2,469,329.

This invention relates to processes wherein gaseous reactants are contacted with particle form solid materials at elevated temperatures for the purpose of thermochemical conversion. In such processes the solid material may or may not be catalytic in nature. Typical of such processes is the catalytic conversion of hydrocarbons and the subsequent regeneration of the catalytic material used therefor. It is well known that gas oils boiling in the range of 450° F. to 750° F. may be converted to gasoline and other products when contacted in the gaseous phase with particle form solid adsorbent materials at controlled conditions of temperature such as, for example, 800° F. and higher pressures usually above atmospheric. The particle form solid adsorbent material may partake of the nature of natural or treated clays such as fuller's earth, superfiltorol which is a treated natural clay comprising mainly alumina and silica, bauxite or of various synthetic associations of alumina, silica or alumina and silica, any of which may have other constituents added such as certain metallic oxides. In a most recent form, this operation has been developed as one wherein a particle form solid contact mass material is passed cyclically as substantially compact columns through two vessels, in the first of which it is contacted with hydrocarbons in the gaseous phase for the purpose of conversion thereof and in the second of which it is subjected to the action of a combustion supporting gas acting to burn therefrom a carbonaceous contaminant deposited thereon in the hydrocarbon conversion vessel. In such a process the conversion of hydrocarbon gases is a net endothermic reaction and the combustion of the contaminant deposit is a net exothermic reaction, the one requiring the supply of heat from an outside source and the other requiring the removal of heat. The present invention is particularly directed to a method for conducting thermochemical reactions of the type above referred to at optimum temperature conditions and for distributing the fluid reactant charge into the reaction zone.

It has been common practice in the case of endothermic reaction vessels to supply the heat of reaction either by superheating the inlet reactant gases above the desired reaction temperature or by introducing the solid catalytic material to the upper end of the vessel at a temperature substantially above the desired reaction temperature, and permitting it to be cooled by the endothermic reaction to an outlet temperature from the lower end of the vessel which is substantially below the desired reaction temperature. Whereas such methods are satisfactory for reactions which are not strongly endothermic, they have distinct disadvantage when applied to many reactions. The principal disadvantage is that such a method of operation involves either subjecting the gaseous reactants to a conversion temperature above the desired reaction temperature during the initial period of the gaseous conversion, during which period the gaseous reactant will most readily react, thereby resulting in over conversion and the production of undesirable quantities of undesirable light products and excessive contaminant deposition of the solid material; or such method of operation involves subjecting the gaseous reactants to reaction temperatures substantially below the desired reaction temperature during the initial period of contact and to temperatures substantially thereabove during the final period of contact. This latter alternative would at first sight appear desirable, but in processes such as hydrocarbon conversion of heavy gas or fuel oils, the conducting of the initial portion of the reaction at low temperatures results in condensation of the higher boiling constituents of the charge with a resultant excessively high contaminant deposition on the solid material. Moreover, in many operations and especially multistage operations, products more uniformly conforming to the desired properties may be obtained by conducting the reaction approximately at the predetermined optimum reaction temperatures throughout rather than at temperatures which are both above and below such optimum.

When clay-type catalysts are regenerated, the temperature thereof must be controlled below a maximum temperature, above which it will be heat damaged. This maximum allowable temperature may be of the order of 1100° F. to 1400° F., depending upon the catalyst involved.

In processes involving the passage of such catalysts through a regenerator as a substantially compact column of particle form material, the excess heat of combustion may be removed by the provision of heat transfer tubes throughout the regenerator. In such an apparatus proper temperature control is obtained only by the use of a great amount of heat transfer surface requiring the maintenance of the solid material temperature reasonably near that of the heat transfer medium. Due to the difficulty of obtaining suitable heat exchange fluids which are stable at temperatures of 1000°–1200° F., for example, a large part of the solid material is maintained at somewhat lower temperatures during the entire regeneration. This is a disadvantage because generally the composition of the contaminant deposit changes as the regeneration progresses, and requires increasingly higher temperatures for its rapid combustion as the regeneration approaches completion. Often the temperatures required for complete and rapid removal of the last part of the contaminant are below those which will damage the solid material but above those obtainable in the apparatus above described. Moreover, although the combustion of a given contaminant might take place very rapidly at a temperature of 900° F., for example, in those sections of the regenerator near the air inlet where the oxygen content of the gas was high, yet the reaction might be very slow at this temperature in other sections of the regenerator where the oxygen, having been partly used, is substantially lower in partial pressure. If, however, higher temperatures of the order say 1000°–1100° F. could be provided in those latter sections of the regenerator high combustion rates would be obtainable there also.

In order to avoid the disadvantage of regenerators of the above type and also to provide higher total gas throughput capacity, regenerators and reactors have recently been provided which consist of a series of alternate reaction and heat exchange stages, the reactant gas being passed in parallel through the reaction stages. The present invention differs in several respects from such multistage vessels and offers several advantages thereover. An important embodiment of the present invention involves the provision in a reaction vessel of a plurality of vertically spaced rows of combined heat transfer and gas handling elements extending horizontally across said vessel, so as to provide heat transfer surface within a portion of the reaction zone sufficient to permit control of the solid material temperature range while at the same time providing a large remaining portion of the reaction zone between said rows of elements wherein the reaction may proceed in the absence of proximate heat transfer surface.

A major object of this invention is the provision in a process for conducting thermochemical fluid reactions in the presence of a moving contact material of an improved method for supplying or withdrawing heat to the reaction zone and for effecting contact between the fluid reactant and contact material under optimum temperature conditions.

A particular object is the provision in a process for conducting a thermochemical fluid hydrocarbon reaction in the presence of a moving column of catalyst of an improved method for supplying or withdrawing heat to or from the reaction zone by means of the fluid reactant charge.

Another object of this invention is the provision of a combined heat transfer and gas handling element adapted for use in such an apparatus as the above.

Another object of this invention is the provision in a process for conversion of hydrocarbons in the gaseous phase in the presence of particle form solid contact mass materials, of a method and apparatus for controlling the gaseous reactant and solid material temperature within a narrow preferred range of temperatures throughout the reaction zone and especially in the vicinity of the gas inlets to the reaction zone.

Another object of the invention is the provision in a process for regeneration of a contaminant bearing particle form solid contact mass material by the action of a combustion supporting gas, of a method and apparatus wherein sufficient heat may be removed from the solid material in those sections of the regeneration zone wherein the regeneration gas is fresh to control the solid material temperature within predetermined limits throughout the entire regeneration zone without the requirement of proximate heat transfer surfaces in those sections of the regeneration zone wherein the combustion supporting gas is relatively spent.

These and other objects of this invention will become apparent from the following description of this invention. Before proceeding with said description certain terms used herein should be defined. The term "gas" or "gaseous material" as used herein and in the claiming of this invention are intended to cover any material in the gaseous phase at the temperature of the operation or reaction regardless of its normal phase at atmospheric temperature. The words "tube" or "tubes" are intended as covering not only circular conduits but conduits of any other contour.

Figure 6:
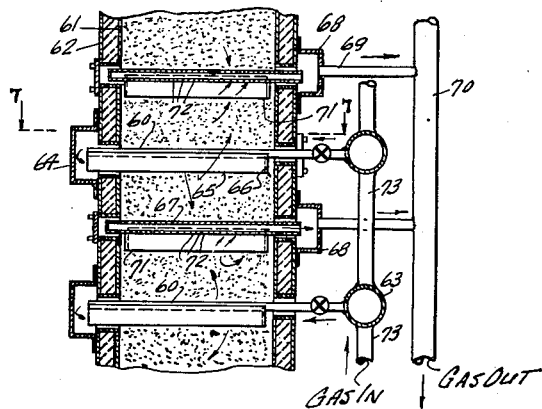
Figure 7:
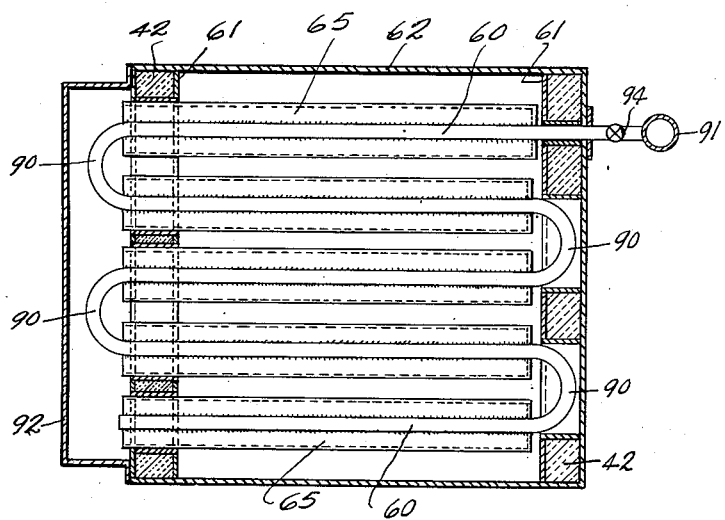

Referring now to the drawings, Figure 1 is an elevational view, partially in section, showing a reaction vessel constructed according to this invention. Figure 2 is a vertical sectional view taken along line 2—2 in Figure 1, Figure 3 is an enlarged sectional view of one of the combined heat transfer and gas handling elements used in the apparatus of Figure 1, Figure 4 is a sectional view of a modified form of such an element, Figure 5 is an elevational view, partially in section, of a vertical section of a vessel which embodies a preferred modification of this invention adapted for catalyst regeneration, and Figure 6 is a similar view of another preferred modification of this invention adapted especially for hydrocarbon conversion and Figure 7 is a cross-sectional view of a modification in the construction of the vessel shown in Figure 6, taken at line 7—7 of Figure 6. All of these drawings are highly diagrammatic in form.

Turning now to Figure 1, we find 10 is the outer shell of a vertical reaction vessel which may be circular or rectangular in cross-sectional contour, 11 is the inner shell thereof and 12 is a layer of insulating material between the two shells. The shell 10 is closed on its upper end by the converging section 13 and on its lower end by converging section 14. An inlet conduit 15 for solid material is connected into the upper section 13 and an outlet conduit 16 having throttle valve 17 thereon is depended from the lower section 14. A plurality of vertically spaced rows of horizontally spaced and horizontally extending tubes 18 and 19 extend across the vessel and through the opposite walls thereof. Two similar fins are attached as by welding along the length of each tube on either side thereof and extend downwardly and outwardly therefrom, so as to provide a solid material-excluding gas space extending along underneath each tube. The fins 20 on tubes 18, which join alternate rows, terminate within the vessel short of the outer shell on one end and plates 22 are provided across the ends of each set of fins on each tube. These fins extend through the vessel shell on the opposite end into the gas outlet manifold box 24 which is attached along the shell, thus communicating each alternate row of gas spaces joined by tubes 18 and fins 20 with a gas outlet manifold box. The fin arrangement on the remaining alternate row 19 of tubes is similar to that above described except that the fins terminate within the vessel and are provided with end plates 23 on the opposite end and extend through the opposite wall of the vessel into gas inlet manifold boxes 25 which extend horizontally across the shell and are attached thereto by flanges 26.

The arrangement may be more clearly understood by reference to Figure 2 which is a sectional view along line 2—2 of Figure 1 and in which like members bear like numerals. It will be seen from Figure 2 that the tubes 19 are offset horizontally so as to lie in the vertical plane between adjacent tubes 18 in the rows above and below. In the vessel shown, the cross-section was such as to require four tubes in some rows and only three in others, in order to provide uniform tube and fin distribution across the vessel cross-section. The invention is not to be limited, however, to such proportion. It will also be noted that the outside fins, on the end tubes in the rows containing four tubes, extend substantially vertically downward.

Turning again in Figure 1, the rows of tubes terminate on one end in horizontal outlet headers 27, which are provided for each row, and on their opposite ends in horizontal inlet headers 28, also provided for each row. The outlet headers are interconnected by riser pipes 29 to the lowermost of which is connected the main outlet conduit 30; and the inlet headers are interconnected by riser pipes 31 to the lowermost of which is connected the main inlet conduit 32. Similarly, the gas inlet manifold boxes 25 are interconnected by riser pipes 33 to the lowermost of which is connected the main gas inlet conduit 34, and the outlet manifold boxes 24 are interconnected by riser pipes 35 to the lowermost of which the main gas outlet pipe 36 is connected.

In operation particle form solid material at the desired reaction temperature enters the vessel through conduit 15 and passes downwardly therethrough as a substantially compact column. The solid material is prevented from channeling downwardly in any given vertical path by the staggered arrangement of the alternate rows of tubes and fins. Contacted solid material is withdrawn from the lower end of the vessel through conduit 16, the rate of withdrawal being controlled by throttle valve 17. Gasiform reactants at the desired reaction temperature enter through conduit 34 and riser pipes 33 into the several inlet manifold boxes 25. The gas is then distributed into the several vertically spaced rows of gas spaces provided by tubes 19 and fins 20. From these gas distributing spaces the reactant gas passes upwardly and downwardly through the solid material toward the nearest rows of gas collecting spaces formed by tubes 18 and fins 20. The gas then disengages from the solid material and collects in these latter gas spaces and passes therefrom into outlet manifold boxes 24 and then through pipes 35 to the main gas outlet conduit 36. There are thus provided a series of superimposed reaction zones wherein the vertical direction of gas flow is opposite in successive zones. The solid material temperature is controlled by supply of a heat exchange fluid through conduit 32, riser pipes 31 and manifolds 28 to the heat transfer tubes 18 and 19. The heat exchange fluid passes from the opposite ends of the tubes into manifolds 27, and thence through pipes 29 to the main outlet conduit 30. Thus the solid material temperature is adjusted at a plurality of levels along the vessel, by indirect heat transfer with a heat exchange fluid, the temperature adjustment being sufficient at each level to prevent the solid material temperature from rising or falling beyond a predetermined limit during its passage between heat exchange levels. Such an apparatus when used for a hydrocarbon conversion process permits very high reactant throughput capacity and permits accurate control of the reaction temperature throughout the reaction zone and especially during the initial and final interval of the gaseous reactant contact with the solid material while at the same time a major portion of the reactant flow through the column is in the absence of indirect heat transfer. Such temperature control not only reduces the amount of contaminant deposit to a minimum but also permits optimum conversion yields and product properties.

The combined heat transfer and gas handling element permits a substantial reduction in the total metal required within the conversion vessel. This is apparent when it is considered that on the one hand the fins which define the gas distributing and collecting spaces also serve as additional heat transfer surfaces thereby reducing the total number of heat transfer tubes required, while on the other hand, the heat transfer tubes serve both to help define the gas distributing and collecting spaces and also to support the fins. Figure 3 is an enlarged sectional view showing the construction of the combined heat transfer element and gas handling elements used in the apparatus of Figure 1; like numerals are used for like member. In some operations larger gas spaces are desirable in which case the fin shape and size may be varied. Such a modified form is shown in Figure 4. In Figure 4, the element is comprised of a circular tube 38 and two angle shaped fins 39, one welded along either side of the tube. When tubes of relatively large diameter are employed, fins attached along their sides and extending substantially vertically downward may be used. Moreover, if desired, tubes of cross-sectional shapes other than circular may be used. In some modifications, it may be desirable to interconnect the ends of adjacent tubes in each row so as to provide a continuous coil for heat exchange fluid flow in each row of tubes. Such a modification is particularly desirable when a relatively great change in the temperature of the heat exchange fluid is desired.

In some applications of the invention the use of heat transfer tubes at both the levels of gas inlet and gas outlet is not necessary. Such a modification is shown in Figure 5 wherein is shown a vertical view, partially in section, of a vertical section of a vessel adapted for either endothermic or exothermic reactions, and particularly well adapted for use as a catalyst regenerator. The vessel is generally the same type as that shown in Figure 1 except for internal modifications as described hereinafter. In Figure 5, 40 represents the outer shell of the vessel, 41 the inner shell and 42 the insulator therebetween. Heat transfer tubes 43 having fins 44 attached along their length are provided in a plurality of vertically spaced rows across the vessel. These elements serve as combined gas inlet distributing and heat transfer elements similarly to those shown in Figures 1 and 2; gas inlet manifold boxes 45 being provided along one side of the vessel shell. A main gas inlet riser pipe 46 is provided from which gas is distributed through pipes 47 having valves 48 thereon into the several inlet manifold boxes. Intermediate the rows of combined heat transfer and gas distributing elements, rows of inverted angle shaped troughs 49 are positioned across the vessel. These channel members are closed on either end and terminate within the vessel short of the external shell. These channels serve as gas collectors and gas is removed therefrom through pipes 50 which extend through the vessel shell and a short distance under the collectors on one end and each of which pipes 50 is connected into the gas outlet duct 51 on the opposite end. The heat transfer tubes connect on their inlet ends into inlet manifolds 52 which are interconnected through pipes 53; and the heat transfer tubes are connected on their outlet ends into manifolds 54 which are interconnected through the outlet riser pipes 55. The construction is thus such as to divide the regenerator into a series of superimposed stages wherein the gas flow is alternately vertically upward and downward through the solid material column flowing therethrough. The solid material temperature is adjusted only in that section of the vessel in the immediate vicinity of the gas inlets in which section the regeneration gas, for example, air, is fresh. Thus the solid material in passing by a given row of heat transfer tubes may be cooled from a temperature of 1150° F. to a temperature of 900° F. and may then be heated in the section of the regenerator between the rows of tubes back to 1150° F. by the heat liberated by contaminant combustion. The air charge may be supplied into the distributing elements at a temperature near that of the column at the level of inlet, i. e. about 850°-950° F. The temperature of the solid material passing by the gas collectors where the air is relatively spent may be of the order of 1025° F. Thus, by permitting the combustion reaction to proceed at a somewhat higher temperature and in the absence of proximate heat transfer surfaces in those sections of the regenerator wherein the air is relatively spent than in those sections wherein the air is fresh, a high and uniform rate of contaminant combustion is provided throughout the regenerator resulting in higher overall burning capacity and efficiency. When the system described above is used for a hydrocarbon cracking reaction, heat is supplied to the catalyst through tubes 43 so as to heat the catalyst at the levels of initial hydrocarbon contact with the catalyst to the optimum conversion temperature. The oil charge is preheated in an external heater (not shown) which may be of conventional construction and is supplied into the column substantially at the column temperature at the levels of initial contact. For example, in cracking a mid continent gas oil boiling within the range about 450°-800° F. in the presence of a silica-alumina clay type catalyst, the catalyst may be heated to about 850° F. at each level of oil inlet. The catalyst temperature may fall off between the rows of heat transfer tubes about 5-30° F. depending upon the spacing of the tubes and the reaction conditions. The oil charge is introduced at about 850° F. In general, it is important that the reactant charge enter the contact material column within about 50° F. plus or minus of the contact material column at the points of initial contact and preferably within at least 25° F. thereof. In some operations the catalyst temperature may be varied at the different levels of heat transfer tubes. For example, in a hydrocarbon cracking conversion process the catalyst and oil inlet temperature may be progressively increased at successively lower levels or groups of levels along the reaction zone so as to counteract the loss in catalyst activity due to contaminant deposition thereon.

Another modification of the invention particularly adapted for hydrocarbon conversion is shown in Figure 6 which is a vertical view, partially in section, of a vertical section of a reactor. This vessel may be of the same general construction as that shown in Figure 1, except for internal modifications as shown and except for provision for sealing either end of the vessel with an inert gas, which provision is now conventional and not shown. Within the vessel shown in Figure 6 are positioned a plurality of vertically spaced rows of tubes 60 which extend through the inner shell 61 and outer shell 62 of the vessel on opposite ends, one end of the tubes in each row connecting into the horizontal inlet manifolds 63 and the opposite open end terminating within the closed header box 64 which is attached horizontally along the outer vessel shell adjacent the row of tubes. Fins 65 are attached along the tubes 60 similarly to those shown heretofore, each pair terminating within the vessel on one end, said end being closed by plate 66, and terminating within the header box 64 on the opposite end. Also positioned within the vessel are vertically spaced rows of tubes 67 located intermediate the rows of tubes 60. As has been mentioned hereinabove in some operations such as the hydrocarbon conversion operation just described, it may be desirable to connect the adjacent ends of the tubes of each row thereof to provide in each row a continuous coil. Such an arrangement is shown in Figure 7 which is a cross-sectional view of an apparatus similar to that in Figure 6 taken at a level just above and looking down on a row of tubes 60 except that while in Figure 6 the heat transfer tubes are arranged for parallel flow of inlet reactants, in Figure 7, the tubes 60 are arranged for series flow of reactants. Thus, the proper ends of the adjacent tubes 67 are connected together by means of U-bends 90 so that reactants enter one of the end tubes from manifold 91 through valve 94 and pass serially through the tubes to issue from the open end of the end tube on the opposite side of the vessel into header box 64 which extends horizontally across the outside of the vessel shell 62. The vapor then distributes throughout header box 92 and passes therefrom under the gas distributing spaces formed by fins 65 which distributing spaces are in free gas flow communication with the interior of header box 64. This arrangement is particularly desirable when the heat of reaction is high requiring substantial superheat in the reactant entering the coils. In such cases a single tube will not provide sufficient heat transfer surface to permit cooling of the oil charge to the catalyst column temperature and it is important in such cases to pass the oil charge through a sufficient number of tubes to insure cooling thereof to a level near that of the catalyst before permitting it to contact the catalyst.

It will be understood that this invention is considered to be broadly applicable to many thermochemical reactions other than those specifically mentioned herein. For example, it may be employed for hydrocarbon polymerization, oxidation, dehydrogenation, and reforming reactions and for hydrocarbon synthesis reactions.

I claim:

1. A method for conducting thermochemical conversions involving a reactant fluid in the presence of a particle form solid contact mass material wherein the contact material temperature tends to change due to said thermochemical conversion which method comprises passing a particle form solid contact mass material through an elongated conversion zone; the contact material moving directly through said zone without substantial reversal in its general direction of flow therethrough, adjusting the temperature of said contact material by indirect heat transfer at a plurality of spaced apart intervals along its path of flow, said adjustment in temperature being in a direction opposite to the contact material change in temperature due to said thermochemical conversion, introducing reactant fluid into said conversion zone into contact with said contact material at a plurality of spaced apart locations each one of said locations of reactant introduction being near and immediately downstream of a separate one of said intervals of indirect heat transfer, whereby the reactant fluid initially contacts only contact material which has been recently adjusted to and is at the desired conversion temperature, maintaining the temperature of said reactant fluid just prior to initial contact with the contact material near that of the contact material at said locations of reactants introduction, flowing the reactant fluid introduced at each location through a separate vertical portion of said conversion zone, along a substantial part of which the flow is in the absence of indirect heat transfer and the temperature is substantially different from the temperature at the location of reactant introduction, and withdrawing fluid reactants from said conversion zone at a second plurality of intervals along the path of solid material flow substantially spaced apart from said intervals of heat transfer.

2. A method for conducting thermochemical conversions involving a reactant fluid within a narrow range of optimum conversion temperatures in the presence of a particle form solid contact material wherein the contact material temperature tends to stray from said narrow range of optimum temperatures due to said thermochemical conversion which method comprises, passing a particle form solid contact material through an elongated conversion zone as a substantially compact gravitating column, adjusting the temperature of said contact material by indirect heat transfer at a plurality of vertically spaced apart intervals within the conversion zone, said adjustment in temperature being in a direction opposite to the stray in temperature due to said thermochemical conversion whereby the contact material is controlled substantially at the optimum conversion temperature at each of said intervals of indirect heat transfer, introducing reactant fluid feed into said conversion zone at a plurality of spaced apart levels along its length which are located only near and immediately below intervals of indirect heat transfer, whereby the reactant initially contacts only contact material which has just been adjusted to the desired conversion temperature, controlling the inlet temperature of said reactant fluid so that it exists within at least about 50° F. of the contact material temperature at the instant of initial contact whereby the fresh reactant fluid feed is converted to fluid products under optimum temperature conditions, flowing the reactant fluid introduced at each level through a separate vertical portion of the column length along a substantial part of which the flow is in the absence of indirect heat transfer and the contact material temperature is substantially different from its temperature at the level of reactant introduction and withdrawing fluid reaction products from said conversion zone at a second plurality of levels along the said conversion zone substantially spaced apart from said levels of reactant introduction.

3. A method for conducting thermochemical conversions involving a reactant fluid within a narrow range of optimum conversion temperatures in the presence of a particle form solid contact material wherein the contact material temperature tends to stray from said narrow range of optimum temperatures due to said thermochemical conversion which method comprises, passing a particle form solid contact material downwardly through a series of communicating reaction zones in which it flows as a substantially compact column, introducing a gasiform reactant heated to suitable reaction temperature into each of said zones and passing it vertically through the column of contact material therein to effect the thermochemical conversion of said reactant to a gasiform product whereby the contact material temperature is changed as it flows along said zones due to said thermochemical conversion, withdrawing the gasiform product from each of said zones at a level vertically spaced from the level of reactant introduction and adjusting the temperature of said contact material to a level near that of the reactant inlet temperature to said zones by indirect heat transfer only at locations in said column immediately above the levels of reactant introduction to and withdrawal from said column in said zones whereby the reactant flowing in each zone undergoes conversion in a portion thereof in the presence of indirect heat transfer and in a separate portion thereof in the absence of indirect heat transfer and at a substantially different temperature from that in the portion of indirect heat transfer.

4. A method for conducting thermochemical conversions involving a reactant fluid within a narrow range of optimum conversion temperatures in the presence of a particle form solid contact material wherein the contact material temperature tends to stray from said narrow range of optimum temperatures due to said thermochemical conversion which method comprises, passing a particle form solid contact material through a series of communicating conversion zones, the contact material moving directly through each zone without substantial reversal in its general direction of flow therethrough, separately introducing reactant fluid heated to an optimum temperature level for effecting said conversion into each conversion zone, passing the reactant fluid through each conversion zone to effect its conversion whereby the temperature of the contact material tends to change due to the thermochemical conversion, withdrawing reaction products from each conversion zone at a point along the path of solid flow substantially spaced apart from the point of reactant introduction, and adjusting the temperature of the contact material in each of said zones in the immediate vicinity of reactant introduction thereto and immediately before it reaches the point of reactant introduction by means of indirect heat transfer while excluding indirect heat transfer from the intermediate portion of each zone lying between the points of reactant introduction and withdrawal, said adjustment being in a direction opposite to the contact material temperature change due to said thermochemical conversion and being sufficient to provide a contact material temperature in the immediate vicinity of reactant introduction into each of said zones which is substantially different from its temperature in said intermediate portion of said zone and which is near said optimum conversion temperature level at which the reactant is introduced.

5. A method for conducting endothermic cracking conversions of high boiling fluid hydrocarbons to lower boiling hydrocarbon products in the presence of a particle form solid contact material which comprises passing a particle form solid contact material substantially unidirectionally through a series of communicating conversion zones, introducing high boiling hydrocarbon feed heated to the desired conversion temperature into each of said conversion zones to initially contact said contact material existing near the inlet temperature of the hydrocarbon feed and applying heat to the contact material by indirect heat transfer upstream in the contact material flow but in the immediate vicinity of the location of hydrocarbon introduction into each of said zones to maintain the contact material near the hydrocarbon inlet temperature and desired reaction temperautre as aforesaid, passing the hydrocarbon feed introduced into each zone while still in contact with the solid material through a substantially lower temperature portion of the zone from which indirect heat transfer is excluded to complete its conversion to lower boiling gasiform products and finally removing the lower boiling gasiform hydrocarbon products from each zone at points substantially spaced apart from the locations of hydrocarbon introduction, the major portion of the hydrocarbon flow through the column being in the absence of indirect heat transfer.

6. A method for conversion of gasiform hydrocarbons comprising passing a particle form solid contact mass material through an elongated reaction zone, the solid material being moved directly through said zone without substantial reversal in its general direction of flow therethrough, passing gasiform hydrocarbon charge, superheated above the desired conversion temperature in indirect heat transfer relationship with said moving solid contact material at a plurality of spaced intervals along its path of flow to substantially supply the heat for the endothermic hydrocarbon conversion thereto, passing the gasiform hydrocarbon conversion charge, after being cooled during said indirect heat transfer relationship to a temperature near that of said contact material, into direct contact with the flowing solid material adjacent and immediately downstream of said intervals of heat transfer, flowing the gasiform hydrocarbons through a substantial portion of said zone which is maintained in the absence of the direct influence of said indirect heat transfer and in which the contact material temperature is substantially below its temperature at the locations of hydrocarbon introduction, and finally withdrawing gasiform conversion products from the reaction zone at a second plurality of intervals along the path of solid material flow spaced apart from said intervals of heat transfer.

7. A method for conversion of gasiform hydrocarbons in the presence of a moving particle form solid contact mass material at controlled elevated temperatures comprising passing a particle form solid contact mass material as a substantially compact column of downwardly flowing solid material through a confined conversion vessel, passing gasiform hydrocarbon charge superheated above the desired conversion temperature but below the temperature of substantial thermal conversion in indirect heat transfer relationship with said column of solid material at a plurality of vertically spaced levels to continually adjust the flowing solid material to the desired limiting range of hydrocarbon conversion temperatures while said hydrocarbon charge is cooled to said limiting range of conversion temperatures before it comes into contact with the solid material, then passing the cooled hydrocarbon charge into the solid material column at a plurality of levels immediately below said levels of indirect heat transfer, flowing the hydrocarbon charge introduced at each level through a separate substantial portion of said column in the absence of proximate indirect heat transfer, the temperature in said last named portion being at a substantially lower conversion level than at the level of hydrocarbon introduction, withdrawing gasiform conversion products from said column of solid material at a second plurality of levels intermediate said levels of heat transfer.

JOHN A. CROWLEY, Jr.

REFERENCES CITED

The following references are of record in the file of this patent:

UNITED STATES PATENTS

| Number | Name | Date |
|---|---|---|
| 1,773,984 | Foster | Aug. 26, 1930 |
| 1,892,319 | Roth | Dec. 27, 1932 |
| 2,161,677 | Houdry | June 6, 1939 |
| 2,270,027 | Alther | Jan. 13, 1942 |
| 2,386,670 | Evans | Oct. 9, 1945 |
| 2,412,917 | Simpson | Dec. 17, 1946 |
| 2,417,393 | Evans | Mar. 11, 1947 |
| 2,436,780 | Simpson | Feb. 24, 1948 |
| 2,458,433 | Simpson | Jan. 4, 1949 |